(12) United States Patent
Tsuchiya et al.

(10) Patent No.: US 6,624,384 B2
(45) Date of Patent: Sep. 23, 2003

(54) METHOD FOR MANUFACTURING INFRARED RAY SENSOR

(75) Inventors: Tetsuo Tsuchiya, Ibaraki (JP); Susumu Mizuta, Ibaraki (JP); Toshiya Kumagai, Ibaraki (JP); Tsutomu Yoshitake, Tokyo (JP); Yuichi Shimakawa, Tokyo (JP); Yoshimi Kubo, Tokyo (JP)

(73) Assignees: NEC Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 09/984,853

(22) Filed: Oct. 31, 2001

(65) Prior Publication Data
US 2002/0139784 A1 Oct. 3, 2002

(30) Foreign Application Priority Data

Mar. 27, 2001 (JP) ........................ 2001-090696

(51) Int. Cl.[7] ........................ B23K 26/00; B23K 26/14; B23K 26/16; B23K 26/18
(52) U.S. Cl. .............. 219/121.69; 219/121.85
(58) Field of Search ............... 219/121.69, 121.68, 219/121.85; 250/338.1

(56) References Cited

U.S. PATENT DOCUMENTS 5,039,654 A * 8/1991 Mizuta et al. ............... 505/1
5,264,375 A * 11/1993 Bang et al. ................. 437/3
5,801,383 A * 9/1998 Wada et al. .............. 250/332
5,966,590 A * 10/1999 Wada et al. ............... 438/54

FOREIGN PATENT DOCUMENTS

JP 2000-143243 5/2000

OTHER PUBLICATIONS

Tetsuo Tsuchia, et al. "Direct Conversion of Titanium Alkoxide into Crystallized $TiO_2$(rutile) Using Coating Photolysis Process with ArF Excimer Laser" National Institute of Materials and Chemical Research, Japanese Journal of Applied Physics, Jpn. J. Appl. Phys. vol. 38 (1999) pp. L823–L825, Part 2, No. 7B, Jul. 15, 1999.

Tetsuo Tsuchiya, et al. "Direct Conversion of Metal Acetylacetonates and Metal Organic Acid Salts into Metal Oxides Thin Films Using Coating Photolysis Process with An Arf Excimer Laser", National Institute of Materials and Chemical Research, Japanese Journal of Applied Physics, Jpn. J. Appl. Phys. vol. 38 (1999) pp. L1112–L1114, Part 2, No. 10A, Oct. 1, 1999.

* cited by examiner

Primary Examiner—M. Alexandra Elve
(74) Attorney, Agent, or Firm—Sughrue Mion, PLLC

(57) ABSTRACT

In an infrared ray sensor for a bolometer, a bridge structure body, a resistive element film for the bolometer, and a protection film is formed via a space on a substrate, and is formed into a solution form by dissolving metal organic compound into solvent. The solution is applied and dried. A laser ray is irradiated for the solution with wavelength of 400 nm or less. A bond between carbon and oxygen is decomposed and cut to thereby form an oxide thin-film.

15 Claims, 2 Drawing Sheets

METHOD FOR MANUFACTURING INFRARED RAY SENSOR

BACKGROUND OF THE INVENTION

This invention broadly relates to a non-cooling type infrared ray sensor of a bolometer type. More specifically, this invention is directed to an infrared ray sensor in which a temperature is varied by absorbing an incident light ray of an infrared ray and a signal of a radiation intensity of the infrared ray is read-out by varying an electrical resistance value in dependency upon the temperature variation.

The bolometer utilizes temperature variation of an electrical resistance value of metal or a semiconductor thin-film, which is thermally insulated from a substrate material.

In general, when temperature coefficient of the electrical resistance (TCR) of the material for the bolometer becomes high, temperature resolution (NETD) of the infrared ray sensor becomes low, thus improving sensitivity.

An alloy thin-film such as a nickel iron alloy has low TCR of about 0.5%. In consequence, it is considered that a conductive oxide thin-film such as a vanadium oxide thin-film, a perovskite type Mn oxide film, and a $YBa_2Cu_3Ox$ thin-film is advantageous as a resistive film for the bolometer for use in the infrared ray sensor with high sensitivity.

This reason will be explained as follows.

These conductive oxide thin-films represents excessively high TCR of about 2%/K in the vanadium oxide thin-film, about 2~5%/K in the $YBa_2Cu_3Ox$ thin-film. Further, the conductive oxide thin film represents extremely high TCR of 5%/K or higher, particularly exceeding 10%/K in the perovskite type Mn oxide by utilizing phase transition between an insulator and a metal caused by magnetic phase transition inherent to such material.

Referring now to FIG. 1, description will be hereinafter made about the structure of the infrared ray sensor in which the oxide thin-film is used as the resistive element for the bolometer in the related art.

In FIG. 1, the reference numeral 1 represents a Si substrate, the reference numeral 2 represents a bridge structure body, a reference numeral 3 represents a space, the reference numeral 4 represents a resistive element for the bolometer, the reference numeral 5 represents a wiring pattern, and a reference numeral represents an infrared ray reflection film.

As illustrated in FIG. 1, the infrared sensor of the bolometer type generally has such a micro-bridge structure that the resistive element 4 for the bolometer is insulated from the Si substrate 1 via the space 3.

To this end, the resistive element 4 for the bolometer can be thermally insulated from the silicon substrate 1. Under such a circumstance, the oxide thin-film selected from the above films is used as the resistive elements for the bolometer.

With this structure, when the infrared ray is entered to a cell, a part thereof is initially absorbed by the infrared ray absorption film 7, and the infrared ray, which is partially transmitted, is reflected by the infrared ray reflection film 8. A resultant infrared ray is completely absorbed by the infrared ray absorption film 7. The absorbed infrared ray generates heat, and heats a diaphragm to thereby vary the electrical resistance of the resistive element 4 for the bolometer.

Then, a signal is detected by a read-out circuit formed in the Si substrate 1 via the wiring pattern 5 connected to the Si substrate 1 through a supporting portion of the bridge structure body 2 from the both ends of the resistive element 4 for the bolometer.

Subsequently, a process for manufacturing the aforementioned infrared ray sensor will be explained as follows.

Initially, metal with infrared reflection rate such as WSi is deposited on the Si substrate 1 with the read-out circuit by the sputtering method to thereby form the infrared reflection film 8.

Then, a sacrifice layer is formed at the position of the space, which will be formed later, on the infrared ray reflection film 8 by the use of a polysilicon film or the like. Herein, it should be noted that the polysilicon film may be deposited by CVD method.

An insulating film such as SIN and $SiO_2$ is deposited on the sacrifice layer by the plasma CVD method, thereby forming the bridge structure body 2. Next, the metal with low thermal conductivity such as Ti is formed on the bridge structure body 2 by the sputtering method, is exposed, is developed and is etched to thereby form the wiring pattern 5.

Successively, the oxide thin-film serving as the resistive element 4 for the bolometer such as a vanadium oxide thin-film, a perovskite type Mn oxide film, and a $YBa_2Cu_3Ox$ thin film is deposited by the sputtering method. The resistive element for the bolometer is also formed by the development and etching process like the above wiring pattern.

The insulating film such as $SiO_2$ is deposited on the bridge structure body 2 including the resistive element by the plasma CVD method in order to protect the resistive element 4 for the bolometer, thus forming the protection film 6.

Further, the infrared ray absorption film 7 such as TiN is deposited on the protection film 6 by the use of the reactive sputtering method.

Finally, the sacrifice layer is wet-etched by hydrazine to form the space 3. Through aforementioned multiple steps, such a diaphragm that the portion including the resistive element 4 for the bolometer is floated is completed.

By adopting such a structure, it is difficult that heat of the infrared ray absorbed by the infrared ray absorption film 7 is escaped to an external portion. Thereby the heat is efficiently utilized to raise up the temperature of the resistive element 4 for the bolometer As discussed above, the non-cooling type infrared ray sensor of the bolometer type can effectively detect the infrared ray by forming the diaphragm of such a structure that the portion including the resistive element 4 for the bolometer is floating.

The non-cooling type infrared sensor is advantageous in low price in addition to operability with respect to a shape and a weight in comparison with the cooling type infrared sensor. However, the conventional non-cooling type infrared ray sensor is produced by using an excessively complex production process.

For example, paying attention for a deposition process, the infrared ray reflection film 8, the resistive element 4 for the bolometer, the wiring pattern 5, and the infrared ray absorption layer 7 are deposited by the sputtering method. Further, the sacrifice layer such as the polysilicon film, the bridge structure body 2, and the protection film 6 are formed by the use of the CVD method.

Moreover, many production steps such as a resist applying step, a drying step, an exposing step, a developing step, a resist removing step, and a washing step are required for formation of each layer such as the wiring pattern 5 and the resistive element 4 for the bolometer.

In the conventional production process, a vapor deposition process with high cost is carried out many times, and a plurality of steps are necessary in the patterning, thus increasing the production cost.

Accordingly, if the vapor deposition process or the patterning step can be reduced, the production cost will be lowered, thereby providing the non-cooling type infrared ray sensor with lower cost.

In addition, the deposition temperature of the resistive element 4 for the bolometer occurs problems during manufacturing the non-cooling type infrared ray sensor of the bolometer type. This is because the resistive element 4 for the bolometer is formed on the Si substrate 1 with the signal read-out circuit via the space 3 for thermally insulating, as discussed above.

Further, it is required that the deposition temperature is low at 400~500° C. not to destroy the signal read-out circuit formed in the Si substrate. Moreover, it is also impossible to utilize a physical etching method such as ion milling during forming the pattern of the resistive element 4 for the bolometer. This is because the Si signal read-out circuit formed on an under layer is damaged by the physical etching.

Thus, it is particularly required that the conductive oxide thin-film used for the resistive element 4 for the bolometer has consistency with the Si production process in addition to high TCR. From the viewpoint of the production process, vanadium oxide is most suitable material among the above-mentioned materials.

This is because the annealing temperature is low at 400~550° C. during forming the vanadium oxide thin-film, as disclosed in Japanese Unexamined Patent Publication (JP-A) No. 2000-143243. Further, the thin-film has such an advantage that the patterning can be performed by the reactive ion etching instead of the physical etching.

However, the TCR of the vanadium oxide thin-film is equal to about 2%/K. As a result, it is insufficient with respect to material to achieve high sensitivity of the non-cooling type infrared ray sensor in the future.

To realize the non-cooling type infrared ray sensor with higher sensitivity, the $YBa_2Cu_3Ox$ thin film or the perovskite type Mn oxide each having higher TCR is more advantageous. However, the high deposition temperature about 1000° C. in the case of the sol-gel method and 700° C. or higher in the case of the sputtering is necessary to realized that these thin-films have high TCR.

As long as such a high deposition temperature is necessary, it is difficult to apply even an attractive thin-film with high TCR for the production process of the infrared sensor. Further, the reactive ion etching can not be applied to form the resistive element for the bolometer by patterning the $YBa_2Cu_3$ Ox thin-film or the perovskite type Mn oxide.

Consequently, the physical etching method such as the ion milling must be used. In this point, it is considered to be difficult to apply these thin-films for the resistive film 4 for bolometer of the infrared ray sensor.

Thus, although the vanadium oxide, the $YBa_2Cu_3Ox$ thin-film or the perovskite type Mn oxide is desirable as the resistive film 4 for the bolometer of the infrared ray sensor, they have problems regarding the production process with respect to the performance and the conventional production method.

SUMMARY OF THE INVENTION

It is therefore an object of this invention to provide a method for manufacturing an infrared ray sensor which is simple in a production process in a non-cooling infrared ray sensor of a bolometer type which is cheap in a production cost with high sensitivity.

According to a first aspect of this invention, in an infrared ray sensor for a bolometer, a temperature is varied by absorbing an incident light ray of an infrared ray, and a signal of radiation intensity of the infrared ray is read-out by changing an electrical resistance value in dependency upon temperature variation.

Under this circumstance, a bridge structure body, a resistive element film for the bolometer, and a protection film is formed via a space on a substrate. Herein, the protection film is placed on a surface including the resistive element film.

Then, the bridge structure body, the resistive element film and the protection film is formed into a solution form by dissolving metal organic compound into solvent.

Next, the solution is applied and dried.

Subsequently, a laser ray is irradiated for the solution with wavelength of 400 nm or less.

Finally, a bond between carbon and oxygen is decomposed and cut to thereby form an oxide thin-film.

According to a second aspect of this invention, the resistive element film is at least one selected from the group consisting of a vanadium oxide thin-film, a perovskite type manganese oxide thin-film, and $YBa_2Cu_3Ox$.

According to a third aspect of this invention, the bridge structure body is at least one selected from the group consisting of a $SiO_2$ thin-film, and $TiO_2$ thin-film, and an $Al_2O_3$ thin-film.

According to a fourth aspect of this invention, the protection layer is at least one selected from the group consisting of an $SiO_2$ thin-film, an $TiO_2$ thin-film, and an $Al_2O_3$ thin-film.

According to a fifth aspect of this invention, the laser light ray with wavelength of 400 nm or less is at least one excimer laser ray selected from the group consisting of ArF, KrF, XeCl, XeF, and F2.

According to a sixth aspect of this invention, the laser ray with wavelength of 400 nm or less is irradiated with multiple stages.

According to a seventh aspect of this invention, the laser ray is irradiated not to completely decompose the metal organic compound in an first stage, and the laser ray is irradiated to crystallize the oxide or to form the oxide into an amorphous form in a subsequent stage.

According to an eighth aspect of this invention, the substrate applied with the metal organic compound is heated to 500° C. to or less during irradiating the laser ray with the wavelength of 400 nm or less.

According to a ninth aspect of this invention, the metal organic compound comprises metal organic acid salt.

According to a tenth aspect of this invention, metal of the metal organic acid salt is at least one selected from the group consisting of V, La, Nd, Pr, Ca, Sr, Ba, Mn, Y, Cu, Si, Ti, and Al.

According to an eleventh aspect of this invention, organic acid of the metal organic acid salt is at least one selected from the group consisting of naphthenic acid, 2-ethyl hexanoic acid, caprylic acid, stearic acid, lauric acid, acetic acid, propionic acid, oxalic acid, citric acid, lactic acid, benzonic, salicylic acid, and ethylenediaminetetraacetic acid.

According to a twelfth aspect of this invention, the metal organic compound comprises metal acetylacetonato complex.

According to a thirteenth aspect of this invention, the metal acetylacetonato complex is at least one selected from the group consisting of V, La, Nd, Pr, Ca, Sr, Ba, Mn, Y, Cu, Si, Ti, and Al.

According to a fourteenth aspect of this invention, solvent for dissolving the metal acetylacetonato complex is at least one selected from the group consisting of butyl acetate, toluene, acetylacetone, and methanol.

According to this invention, the vapor deposition process or the exposing step, the developing step, and the etching step can be reduced by adopting the optical reaction process using the laser ray during forming the oxide thin-film. Thereby, it is possible to provide the non-cooling type infrared my sensor with low cost.

DESCRIPTION OF PREFERRED EMBODIMENTS

Description will be thereinafter made about a method for manufacturing an infrared ray sensor according to this invention.

Figure 1:
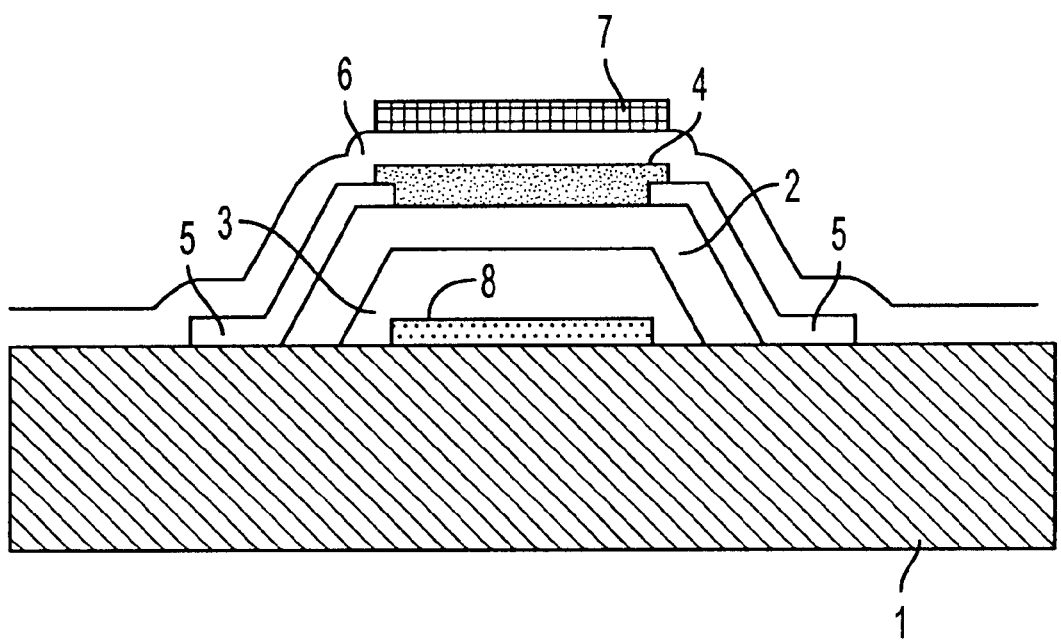
FIG. 1 is a diagram showing an example of a non-cooling type infrared ray sensor of a bolometer type in the related art.

This invention relates to a non-cooling type infrared ray sensor of a bolometer type, as illustrated in FIG. 1. More specifically, this invention is directed to an infrared ray sensor in which a temperature is varied by absorbing an incident light ray of an infrared ray and a signal of intensity of the incident infrared ray is read-out by varying an electrical resistance value in dependency upon the temperature variation.

With this structure, each of the bridge structure body 2 formed via the space 3 on the substrate 1, the resistive film 4 for the bolometer, and the protection layer 6 placed on the surface including the resistive film is made into solution by dissolving the metal organic compound in solvent is applied, is dried, and then is irradiated by the laser ray with wavelength of 400 nm or less, so that a bond between carbon and oxygen is cut and decomposed to thereby form an oxide thin-film.

When the solution of the organic metal compound is applied on the substrate, is dried, and then is irradiated by the laser ray with the wavelength 400 nm or less, the applied organic metal compound including metal is decomposed, and further, can be crystallized under a low temperature of the room temperature or 400° C. or less. According to this invention, the production process of the infrared ray sensor can be simplified by utilizing such an effect.

By employing the production method according to this invention, it is unnecessary to use the vapor deposition process such as the CDV method or the sputtering method during forming each thin-film of the bridge structure body 2, the resistive film 4 for the bolometer, and the protection layer 6.

Further, the deposition under the low temperature is possible. Consequently, this invention can apply the perovskite type Mn oxide or the $YBa_2Cu_3Ox$ thin-film to the resistive film 4 for the bolometer, although it is considered that the conventional case can not apply thereto.

As the resistive film 4 for the bolometer, use will be made of the oxide thin-film such as the vanadium oxide film, the perovskite type Mn oxide and the $YBa_2Cu_3Ox$ thin-film. The vanadium oxide thin-film has the low deposition temperature of 500° C. or less, and therefore, dose not almost cause the problem with respect to the production process. However, its TCR is 2%/K, slightly low.

By contrast, the perovskite type manganese oxide thin-film or the $YBa_2Cu_3Ox$ thin-film, particularly, the perovskite type manganese oxide thin-film can realize high TCR exceeding 10%/K, thus being more advantageous to realize the infrared ray sensor with high sensitivity.

In the meantime, the oxide thin-film such as an $SiO_2$ thin-film as an insulator, a $TiO_2$ thin-film, an $Al_2O_3$ thin-film is used as the bridge structure body 2 and the protection layer 3. Herein, it should be noted that the thickness of the oxide thin-film is variable within the range between about 0.01 and 10 µm in accordance with the purpose.

When the bridge structure body 2 and the protection layer 6 are conductive, detection sensitivity regarding variation of the electrical resistivity of the resistive film 4 for the bolometer is degraded. In consequence, it is required that each layer has excellent insulating characteristic with extremely high resistance.

When the substrate applied with the organic metal oxide is set in the air or in a chamber capable of controlling the atmosphere, and the laser ray having the wavelength of 400 nm or less is irradiated with the desired light intensity and the repetition number, the bond between the carbon and the oxygen of the applied organic metal compound containing metal is cut and decomposed, and is further can be crystallized under the low temperature, as discussed above.

An ultraviolet laser ray with a small heating effect is used as the laser ray. Herein, the ultraviolet ray includes an excimer laser ray such as XeF (351 nm), XeCl (308 nm), KrF (248 nm), ArF (193 nm), and F2 (157 nm) or an Ar ion laser ray (second higher harmonic wave: 257 nm).

For example, in the case where the ArF excimer laser ray is used, the oxide is crystallized with the repetition number of 1~20 Hz, the intensity of 10~70 mJ/cm$_2$, and the irradiation time of about 3~15 minutes, alternatively, an amorphous structure will be formed.

In this case, when the irradiation intensity of the laser ray is too weak, the crystallization does not occur, so that the effect of the irradiation can not be achieved. On the other hand, the intensity is too strong, ablation occurs, and the material of the thin-film is vaporized.

Accordingly, it is desirable that the irradiation intensity falls within the aforementioned range, and the irradiation is carried out under an optimum condition in dependency upon the types of the oxide thin-films.

Under the above condition, an excessively high deposition temperature of 700° C. or higher is necessary by irradiating the excimer laser ray to the applied solution for the perovskite type Mn oxide in the conventional technique. In contrast, it is becoming possible to manufacture the perovskite type Mn oxide thin-film even under a low temperature near the room temperature according to this invention.

It is effective to perform the irradiation of the laser ray with multiple stages, at least two stages. Thereby, the decomposition can be completely carried out by dividing into the multiple stages even when the decomposition can not be accomplished with one stage.

In this case, it is desirable that the initial stage of irradiation is carried out with such weak irradiation that the metal organic compound is not completely decomposed.

Then, it is preferable that the strong irradiation is performed so as to crystallize the perovskite type Mn oxide.

Such a multiple stage method is particularly effective when the metal organic acid salt is utilized as the metal organic compound.

If the metal organic acid salt is decomposed with the multiple stages, it is possible to stably decompose the metal organic acid salt difficult to decompose with the normal one stage. The multiple stage irradiation is considered to be effective from the following reason.

Namely, the metal organic compound can be excited to a quasi-stable state by the use of the weak laser irradiation at the initial stage. From the subsequent stages, the bond between the carbon and the oxygen is cut-out by the strong laser irradiation, so that the decomposition and crystallization to the metal oxide is carried out effectively.

On the other hand, for example, when the laser irradiation is carried out with one stage in the case of a desired kind of metal organic acid salt, the metal organic acid salt molecular is readily vaporized, and thereby the oxide thin-film can not be often obtained.

In the two-stage irradiation, for example, the ArF excimer laser is used. Under such a circumstance, the initial irradiation is carried out with 10 mJ/cm$^2$ and 50 Hz for 30 seconds, and successively, the second irradiation is performed with 50 mJ/cm$^2$ and 10 Hz for 5 minutes.

During irradiating the laser ray, the insulating substrate applied with the metal organic compound is heated up to the temperature of 400° C. or less. Thereby, crystallinity of the perovskite type Mn oxide thin-film can be further improved compared to the case of the irradiation at the room temperature.

In this event, the reason for using the metal organic compound during forming these oxide thin-films will be explained as follows.

Namely, organic group constituting the metal organic compound serves to insulate metal ions to each other by a steric hindrance effect such that particles does not generate by aggregating the metal ions to each other and crystal-growing during forming the oxide thin-film by decomposing after application.

Accordingly, the above organic group can be used as long as the steric hindrance effect appears. As the metal organic compound, metal organic acid salt and organic metal complex compound are exemplified, as described in a paper Japanese Journal of Applied Physics 38 volume, L823 page 1999, and 38 volume, L1112 page, 1999. Herein, it is to be noted that these metal organic compounds can be also used as mixture of two kinds or more.

The metal organic acid salt is obtained by neutralizing various kinds of metal ions with various kinds of organic salt. As the organic acid, carboxylic acid is preferable, and for example, aliphatic carboxylic acid, alicyclic carboxylic acid, and aromatic carboxylic acid are exemplified.

As the aliphatic carboxylic acid, 2-ethyl hexanoic acid, caprylic acid, stearic acid, lauric acid, acetic acid, propionic acid, oxalic acid, citric acid, lactic acid are exemplified.

As the alicyclic carboxylic acid, for example, naphthenic acid is exemplified. As the aromatic carboxylic acid, benzoic and salicylic acid are exemplified.

At least one selected from the group of consisting of V, La, Nd, Pr, Ca, Sr, Ba, Mn, Y, Cu, Si, Ti, and Al are used as the metal constituting the metal organic acid salt. In this invention, the metal organic acid salt constituting the perovskite type Mn oxide is used by mixing to the predetermined composition ratio.

The organic metal complex is a compound formed by coordinating the organic group into the metal. Specifically, metal acetylacetonato is exemplified. Herein, the metal acetylacetonato is metal complex formed by combining acetylacetone with metal In the metal acetylacetonato, a metal acetylacetonato of an objective metal oxide is dissolved in solvent to form solution, and the solution is decomposed to form the metal oxide. The metal acetylacetonato is thus formed, but not limited particularly. For example, acetylacetonato selected from the group consisting of V, La, Nd, Pr, Ca, Sr, Ba, Mn, Y, Cu, Si, Ti, and Al as the metal is exemplified.

According to this invention, the acetylacetonato of the metal constituting the perovskite type Mn oxide and the other metal organic compound are mixed to the predetermined composition ratio for use.

The above organic metal compound is dissolved into solvent to form the metal organic compound solution for use. In this event, the kind or used quantity of the solvent is used such that the metal organic compound can be dissolved.

For example, in the case of the metal organic acid salt, the organic solvent is used. The organic solvent can dissolve the metal organic acid salt or the metal acetylacetonato. In this case, each metal organic compound has difference with respect to solubility for the solvent. Consequently, the solvent must be selected to be dissolved uniformly.

For example, as the solvent, hydrocarbon serving as the solvent without polarity such as hexane, octane, benzene, toluene, and tetralin is exemplified.

In addition, use can be made of alcohol such as acetylacetone, methanol and amine, organic acid such as pyridine, acetic acid and propionic acid, and ester such as butyl acetate.

Further, these organic solvents may be combination of one kind or two or more kinds in accordance with the types of the metal acetylacetonato.

EXAMPLES

Description will be hereinafter made about the method for manufacturing the infrared ray sensor according to this invention, but this invention will not be restricted to the examples.

First Example

The metal such as WSi with the high reflection rate was formed on the substrate with read-out circuit by the sputtering method so as to serve as the infrared ray reflection film 8. This infrared ray reflection film 8 was made by the use of the conventional method.

Figure 2A:
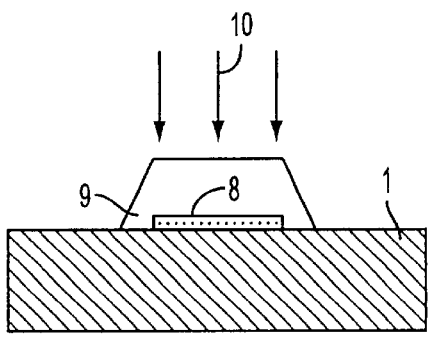
FIGS. 2 through 2E are diagrams showing an example of a production process of an non-cooling type infrared ray sensor of a bolometer type according to this invention.
Figure 2B:
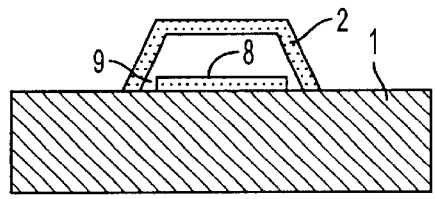

Subsequently, solution diluted acetylacetonato Ti solution by n-butyl acetate with double was applied on the infrared ray reflection film 8, and then the drying step under 150° C. was repeated to form the sacrifice layer 9, as illustrated in FIG. 2A.

An ArF excimer laser ray 10 was irradiated for the sacrifice layer 9 at the room temperature in the air, as illustrated in FIG. 2A. In this event, the repetition frequency of the laser ray was 20 Hz and the laser intensity was 50 mJ/cm$_2$.

As a result, an only thin layer near the surface, which was entered and irradiated with the laser ray, was crystallized for the sacrifice layer 9, thus obtaining the TiO$_2$ thin-film having a rutile structure. Under this circumstance, no chemical change occurred for the internal portion of the sacrifice layer 9 which was not entered with excimer ray.

Such a $TiO_2$ thin-film layer served as the bridge structure body 2. In this case, the bridge structure body 2 was conventionally manufactured the following process. Namely, the polysilicon film was on the infrared ray reflection film 8 by the CVD method, and then the insulating film such as $SiO_2$ was deposited on the thin-film by the use of the plasma CVD method.

Thus, the vapor deposition process was carried out at least twice in the conventional case. In contrast, the bridge structure body 2 could be advantageously formed without the vapor process according to this invention.

The metal with low thermal conductivity such as Ti was deposited on the bridge structure body 2, was exposed, was developed, and was etched, thereby forming the wiring pattern 5.

Figure 2C:
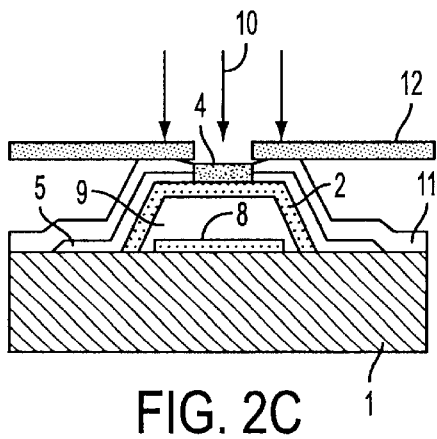

Next, the solution, which was dissolved naphtheinic acid V solution into toluene as the metal organic compound, was spin-coated on the bridge structure body 2, and then was dried at 200° C. for 10 minutes. Such a step was repeated five times to thereby form a naphtheinic acid V layer 11, as illustrated in FIG. 2C.

Successively, a mask 12, which was capable of transmitting the laser ray with the wavelength of 400 nm or less for only the pattern portion of the resistive element 4 for the bolometer, was set on the bridge structure body 2.

Under such a state, the ArF excimer laser ray 10 was irradiated with 10 $mJ/cm^2$, 50 Hz, for 30 seconds, further, 50 $mJ/cm^2$, 10 Hz for 5 minutes at room temperature in the air.

As a result, only the portion of the resistive element 4 for the bolometer irradiated with laser ray was crystallized into $VO_X$. No chemical change occurred for the other masked naphtheinic acid V layer 11, thus remaining in the state of the metal organic compound itself.

Then, the naphtheinic acid V layer 11 serving as the non-irradiation portion was dissolved by washing with organic solvent, and was selectively removed. Thereby, only the crystallized portion of the resistive element 4 for the bolometer was formed on the bridge structure body 2.

In this stage, the portion of the sacrifice layer 9 was protected by the bridge structure body 2 formed on surface thereof, and therefore, was not contacted with the organic solvent, thus remaining in the state itself.

In the conventional case, the vapor process for forming the VOx thin-film by the sputtering method and the subsequent exposure, the development, and the etching steps were required to form the resistive element 4 for the bolometer.

By contrast, such complex and multiple stage process was unnecessary to form the resistive element 4 for the bolometer formed by the VOx thin-film according to this invention.

Figure 2D:
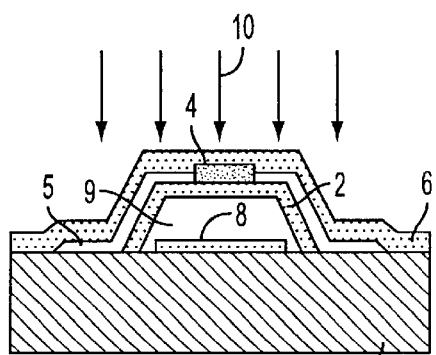

Subsequently, the solution diluted acetylacetonato Ti solution by n-butyl acetate with double was applied on the bridge structure body 2 including the resistive element 4 for the bolometer, and then was dried at 150° C. to form an acetylacetonato Ti layer with the thickness of 100 nm, as illustrated in FIG. 2D.

The ArF excimer laser ray 10 was irradiated for such a layer at the room temperature in the air, as illustrated in FIG. 2D. In this event, the repetition frequency of the laser ray was 20 Hz, and the laser intensity was 50 $mJ/cm^2$.

As a result, the acetylacetonato Ti layer was entirely irradiated by the use of the laser ray and was crystallized, thus becoming the $TiO_2$ thin-film.

Such a $TiO_2$ thin-film layer became the protection layer 6 for shielding the resistive element 4 for the bolometer from the external. In the conventional production method, it was necessary to deposit the insulating film such as $SiO_2$ by the plasma CVD method in order to fabricate the protection layer 6. By contrast, it was unnecessary to use the vapor deposition process during forming the protection layer 6 in the production method according to this invention.

Finally, the infrared ray absorption film 7 such as TiN was deposited on the protection layer 6 by the use of the reactive sputtering method.

Thereafter, the excimer laser ray was irradiated for a part of the bridge structure body 2 into a slit shape for ablation, thus forming the slit. Successively, the acetylacetonato Ti layer, which served as the sacrifice layer 9 by washing with the organic solvent, was dissolved and removed, thereby forming the space 3. Such a diaphragm that the resistive element 4 for the bolometer was floating, was formed via the forming method.

In this event, such a principle that the cell operates as the infrared ray sensor will be explained as follows.

When the infrared ray is entered into the cell, it is partially absorbed by the infrared absorption film 7. The partially transmitted infrared ray is reflected by the infrared reflection film 8, so that the incident infrared ray is completely absorbed by the infrared absorption film 7. The absorbed infrared ray generates the heat, and heats the diaphragm to change the electrical resistance of the resistive element 4 for the bolometer.

Figure 2E:
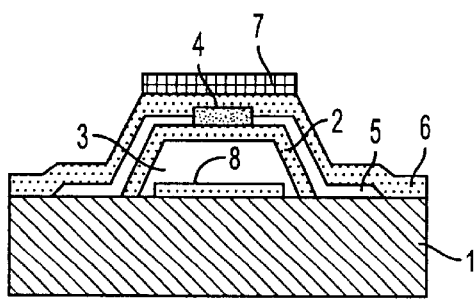

As discussed above, the vapor deposition process was necessary with the exposing step, the developing step, and the etching step every when each layer is formed according to the conventional case. To this end, an excessively many steps were required to form the diaphragm structure illustrated in FIG. 2E.

In the meantime, the vapor deposition process was used only for forming the infrared ray reflection film 8, the wiring pattern 5, and the infrared ray absorption film 7 according to this invention.

Further, the exposing step, the developing step, and the etching step can be largely reduced. Consequently, it is possible to manufacture the infrared ray sensor with excessively reduced steps, thus largely contributing to low cost of the infrared ray sensor.

Second Example

The infrared ray reflection film 8 was formed on the Si substrate 1 with the read-out circuit like the first example. Then, solution, which was dissolved 2-ethyl hexanolato (alkoxide) into mixed solution of toluene and acetylacetone, was applied, and then was repeatedly dried at 150° C. to thereby form the sacrifice layer 9 illustrated in FIG. 2A.

The ArF excimer ray 10 was irradiated for the sacrifice layer 9 at room temperature in the air, as illustrated in FIG. 2A In this event, the laser irradiation was carried out with two stages.

In the first stage, the repetition frequency of the laser ray was 50 Hz, and the laser intensity was 10 $mJ/cm^2$ for 30 seconds. In the second stage, the repetition frequency of the laser ray was 10 Hz, and the laser intensity was 30 $mJ/cm^2$ for 5 minutes.

As a result, only a thin film of about several microns near the surface, which was entered with the laser ray, was changed so as to serve as an amorphous $SiO_2$ thin-film. Under this condition, no chemical change occurred for the internal of the sacrifice layer 9 which was not entered with the excimer laser ray. Such a $SiO_2$ thin-film layer served as the bridge structure body 2.

The metal with thermal conductivity such as Ti was deposited on the bridge structure body 2 by the sputtering method, and the wiring pattern 5 was formed by the exposing step, the developing step, and the etching step. Then, two types of the perovskite type Mn oxide thin-film and $YBa_2Cu_3Ox$ thin-film were produced as the resistive element 4 for the bolometer on the bridge structure body 2 by the following method.

Initially, in the perovskite type oxide thin-film, the metal organic acid based naphthenic acid La solution, naphthenic acid Sr solution, and naphthenic acid Mn solution were used as the metal organic compound, and were dissolved into toluene such that the ratio of La, Sr, and Mn was equal to 0.8:0.2:1.

This solution was spin-coated on the bridge structure body 2, and then was dried at 200° C. for 10 minutes. This step was repeated five times to thereby form a naphthenic acid based La—Sr—Mn layer 11, as illustrated in FIG. 2C.

Successively, the mask 12 for transmitting the laser ray with the wavelength of 400 nm or less for only the pattern portion of the resistive element 4 for the bolometer was set on the bridge structure body 2.

Under this state, the Si substrate 1 was heated under 250° C., and was irradiated with the ArF excimer laser ray with $10 mJ/cm^2$ and 50 Hz for 30 seconds, further with $50 mJ/cm^2$ and 10 Hz for 5 minutes in the air.

As a result, the portion of the resistive element 4 for the bolometer irradiated with laser ray was crystallized into the perovskite type Mn oxide. However, no chemical change occurred for the other masked portion, thus remaining to the state of the metal organic compound itself.

In this stage, the non-irradiation portion was dissolved and selectively removed by washing by the organic solvent. In consequence, only the portion of the crystallized resistive element 4 was formed on the bridge structure body 2 as the perovskite type Mn oxide thin-film.

In this stage, the portion of the sacrifice layer 9 was protected by the bridge structure body 2 formed on the surface, and therefore, was not contacted with the organic solvent, thus remaining in the state itself.

It was observed that thus-formed perovskite type Mn oxide thin-film represented the large variation of the electrical resistance occurred by the phase transition between the insulator and the metal inherent to the material near 300K. With the phase transition, high TCR of about 10%/K was obtained near 300 K.

This value was high in comparison with TCR of about 2%/K which was generally obtained in the VOx based thin film, being advantageous in high sensitivity of the infrared ray sensor. Further, the electrical resistivity was about 1 Ωcm near such temperature, and fell within the range of the electrical resistivity required for the material for the bolometer.

As mentioned above, it is possible to deposit the perovskite type oxide, which was conventionally required high deposition temperature, at low temperature of 500° C. or less by using the production method according to this invention.

Further, It is possible to directly form the pattern of the resistive element 4 for the bolometer by using the mask during forming the thin-film without the physical etching method. Consequently, this invention is excessively epoch-making as the method for manufacturing the infrared ray sensor because the conventional problem can be solved simultaneously.

Then, in the $YBa_2Cu_3Ox$ thin-film, acetylacetonato Y solution, acetylacetonato Ba solution, and acetylacetonato Cu solution were used as the metal organic compound, and were dissolved into butyl acetate such that the ratio of Y, Ba, and Cu was equal to 1:2:3.

This solution was spin-coated on the bridge structure body 2, and then was dried at 200° C. for 10 minutes. This step was repeated five times to thereby form an acetylacetonato based Y—Ba—Cu layer 11, as illustrated in FIG. 2C.

In this state, the pattern portion of the resistive element 4 for the bolometer was masked on the bridge structure body 2. Further, the mask for transmitting the laser ray was set for the other portion, and was irradiated with laser ray having relatively high intensity of $500 mJ/cm^2$ for 3 minutes.

As a result, the portion except for the pattern portion of the resistive element 4 for the bolometer was ablated by the laser ray with high intensity, and thereby, the organic metal compound was removed.

Subsequently, the mask was removed, and the ArF excimer laser ray was irradiated with $10 mJ/cm^2$ and 50 Hz for 30 seconds, further, $50 mJ/cm^2$ and 10 Hz for 5 minutes at 300° C. in oxygen atmosphere. In consequence, only the portion of the resistive element 4 for the bolometer irradiated at second time became the $YBa_2Cu_3Ox$ thin-film having a perovskite type crystal structure.

The $YBa_2Cu_3Ox$ thin-film represented the temperature variation of the semiconducting electrical resistance near 300K, and TCR was almost constant irrespective of the temperature at 4%/K.

Further, the electrical resistivity was about 0.1 Ωcm near the room temperature, and fell within the range of the electrical resistivity required for the material for the bolometer.

The protection film 6 was deposited on the bridge structure body 2 including the resistive element 4 formed by the aforementioned process with the following steps.

Initially, the solution dissolved lauric acid Al into the mixed solution of toluene and methanol was applied, and was dried to thereby form a lauric acid Al layer with the thickness of 100 nm. The ArF excimer laser ray was irradiated for such a layer at the room temperature in the air, as illustrated in FIG. 2A. In this event, the repetition frequency of the laser ray was 20 Hz, and the laser intensity was $30 mJ/cm^2$.

As a result, the lauric acid Al layer was entirely irradiated by the laser ray, and was chemically changed, thus becoming an amorphous $AlO_2$ thin-film. Such an $AlO_2$ thin-film became the protection layer 6, and served to shield the resistive element 4 for the bolometer from the external. Finally, the infrared ray absorption film 7 such as TIN was deposited on the protection film 6 by the reactive sputtering method, Thereafter, the excimer laser ray was irradiated for a part of the bridge structure body 2 into a slit shape to form the slit. Successively, the 2-ethyl hexanolato (alkoxide) of Si serving as the sacrifice layer 9 was dissolved and removed by washing with the organic solvent, thus forming the space 3. By this forming method, such a diaphragm that the resistive element 4 for the bolometer was floating was formed.

Evaluation was made about the temperature resolution NETD of the infrared ray sensor using two types of infrared ray sensors produced by the aforementioned process using the perovskite type Mn oxide thin-film and the $YBa_2Cu_3Ox$ thin-film.

As a result, the perovskite type Mn oxide thin-film had low TCR of ⅓ or less and the $YBa_2Cu_3Ox$ thin-film had the NETD value of about 70% for conventional case in comparison with the infrared ray sensor using the conventional vanadium oxide thin-film for the resistive element 4 for the bolometer in accordance with high TCR of these thin-films.

As described above, the vapor deposition process can be omitted except for the infrared ray reflection film 8, and the wiring pattern 5, and the infrared ray absorption film 7 in the method for manufacturing the non-cooling type infrared ray sensor according to this invention., Further, the patterning step such as the exposing step, the developing step and the etching step can be reduced. Consequently, the device can be manufactured with extremely small number of steps, thus largely contributing to the low cost of the infrared ray sensor.

While this invention has thus far been disclosed in conjunction with several embodiments thereof, it will be readily possible for those skilled in the art to put this invention into practice in various other manners.

What is claimed is:

1. A method for manufacturing an infrared ray sensor for a bolometer in which a temperature of said bolometer is varied by absorbing an incident light ray of an infrared ray, and a signal of radiation intensity of the infrared ray is read-out by changing an electrical resistance value in dependency upon temperature variation, comprising the steps of:

forming a bridge structure body, a resistive element film for the bolometer, and a protection film via a space on a substrate, the protection film being placed on a surface including the resistive element film;

placing the bridge structure body, the resistive element film and the protection film into a solution formed by dissolving metal organic compound into solvent;

applying and drying the solution;

irradiating the dried solution with a laser ray having a wavelength of 400 nm or less; and decomposing by cutting a bond between carbon and oxygen to thereby form an oxide thin-film.

2. A method as claimed in claim 1, wherein:

the resistive element film is at least one selected from the group consisting of a vanadium oxide thin-film, a perovskite type manganese oxide thin-film, and $YBa_2Cu_3Ox$.

3. A method as claimed in claim 1, wherein:

the bridge structure body is at least one selected from the group consisting of a $SiO_2$ thin-film, a $TiO_2$ thin-film, and an $Al_2O_3$ thin-film.

4. A method as claimed in claim 1, wherein:

the protection layer is at least one selected from the group consisting of a $SiO_2$ thin-film, a $TiO_2$ thin-film, and an $Al_2O_3$ thin-film.

5. A method as claimed in claim 1, wherein;

the laser light ray with wavelength of 400 nm or less is at least one excimer laser ray selected from the group consisting of ArF, KrF, XeCl, XeF, and F2.

6. A method as claimed in claim 1, wherein:

the laser ray with wavelength of 400 nm or less is irradiated with multiple stages.

7. A method as claimed in claim 6, wherein:

the laser ray is irradiated not to completely decompose the metal organic compound in an first stage, and the laser ray is irradiated to crystallize the oxide or to form the oxide into an amorphous form in a subsequent stage.

8. A method as claimed in claim 1, wherein:

the substrate applied with the metal organic compound is heated to 500° C. or less during irradiating the laser ray with the wavelength of 400 nm or less.

9. A method as claimed in claim 1, wherein:

the metal organic compound comprises metal organic acid salt.

10. A method as claimed in claim 9, wherein:

metal of the metal organic acid salt is at least one selected from the group consisting of V, La, Nd, Pr, Ca, Sr, Ba, Mn, Y, Cu, Si, Ti, and Al.

11. A method as claimed in claim 9, wherein:

organic acid of the metal organic acid salt is at least one selected from the group consisting of naphthenic acid, 2-ethyl hexanoic acid, caprylic acid, stearic acid, lauric acid, acetic acid, propionic acid, oxalic acid, citric acid, lactic acid, benzoic, salicylic acid, and ethylenediaminetetraacetic acid.

12. A method as claimed in claim 1, wherein:

the metal organic compound comprises metal acetylacetonato complex.

13. A method as claimed in claim 12, wherein:

the metal acetylacetonato complex is at least one selected from the group consisting of V, La, Nd, Pr, Ca, Sr, Ba, Mn, X, Cu, Si, Ti, and Al.

14. A method as claimed in claim 12 or 13, wherein:

solvent for dissolving the metal acetylacetonato complex is at least one selected from the group consisting of butyl acetate, toluene, acetylacetone, and methanol.

15. A method as claimed in claim 2, wherein:

the resistive element film is at least one selected from the group consisting of a vanadium oxide thin-film and a perovskite type manganese oxide thin-film.

* * * * *